US010753431B2

(12) United States Patent
Beck et al.

(10) Patent No.: US 10,753,431 B2
(45) Date of Patent: Aug. 25, 2020

(54) MOTOR VEHICLE TRANSMISSION

(71) Applicant: ZF Friedrichshafen AG, Friedrichshafen (DE)

(72) Inventors: Stefan Beck, Eriskirch (DE); Uwe Griesmeier, Markdorf (DE); Matthias Horn, Tettnang (DE); Johannes Kaltenbach, Friedrichshafen (DE); Jens Moraw, Friedrichshafen (DE); Gerhard Niederbrucker, Friedrichshafen (DE); Stephan Scharr, Friedrichshafen (DE); Viktor Warth, Friedrichshafen (DE); Michael Wechs, Weißensberg (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 112 days.

(21) Appl. No.: 16/130,404

(22) Filed: Sep. 13, 2018

(65) Prior Publication Data

US 2019/0078664 A1   Mar. 14, 2019

(30) Foreign Application Priority Data

Sep. 14, 2017   (DE) .................. 10 2017 216 309

(51) Int. Cl.
*F16H 3/66* (2006.01)
*F16H 3/72* (2006.01)
*F16H 7/18* (2006.01)

(52) U.S. Cl.
CPC .............. *F16H 3/725* (2013.01); *F16H 7/18* (2013.01); *F16H 2200/0043* (2013.01); *F16H 2200/2007* (2013.01); *F16H 2200/2043* (2013.01)

(58) Field of Classification Search
CPC .............. F16H 3/66; F16H 2200/0043; F16H 2200/2007; F16H 2200/2043; F16H 2200/2097; F16H 2200/2041
See application file for complete search history.

(56) References Cited

U.S. PATENT DOCUMENTS

| 9,005,063 | B2 | 4/2015 | Ziemer |
| 9,631,709 | B2 | 4/2017 | Scholle et al. |
| 2004/0248685 | A1* | 12/2004 | Yi .......................... F16H 3/663 |
| | | | 475/119 |

(Continued)

FOREIGN PATENT DOCUMENTS

| DE | 102012201365 A1 | 8/2013 |
| DE | 102013013947 A1 | 2/2015 |
| DE | 102015223299 A1 | 6/2017 |

OTHER PUBLICATIONS

German Search Report DE102017216309.7 dated Nov. 8, 2018. (10 pages).

*Primary Examiner* — Stacey A Fluhart
(74) *Attorney, Agent, or Firm* — Dority & Manning, P.A.

(57) ABSTRACT

A transmission (G) for a motor vehicle includes an electric motor (EM), an input shaft (GW1), an output shaft (GW2), two planetary gear sets (P1, P2), and at least five shift elements (K1, B1, K2, K3, K4), wherein different gear ratios between the input shaft (GW1) and the output shaft (GW2) are selectable by actuating the at least five shift elements (K1, B1, K2, K3, K4) and, in addition, in interaction with the electric motor (EM), different operating modes are implementable. A drive train for a motor vehicle including such a transmission (G) and to a method for operating same are also provided.

16 Claims, 9 Drawing Sheets

(56) References Cited

U.S. PATENT DOCUMENTS

2006/0234821 A1* 10/2006 Bucknor ................ B60K 6/365
 475/5
2007/0275808 A1* 11/2007 Iwanaka ................. B60L 58/12
 475/5
2018/0328465 A1 11/2018 Warth et al.

* cited by examiner

| Gear | K1 | B1 | K2 | K3 | K4 |
|------|----|----|----|----|----|
| 1    | x  |    |    | x  |    |
| 2    |    |    | x  | x  |    |
| 3.1  |    |    |    | x  | x  |
| 3.2  | x  |    |    |    | x  |
| 3.3  |    |    | x  |    | x  |
| 3.4  | x  |    | x  |    |    |
| 4.1  |    | x  |    | x  |    |
| 4.2  | x  | x  |    |    |    |
| 4.3  |    | x  | x  |    |    |
| EDA-V |   |    | x  |    |    |
| E1   |    |    | x  | x  |    |

Fig. 4

| Gear | K1 | B1 | K2 | K3 | K4 | K5 |
|---|---|---|---|---|---|---|
| 1 | x | | | x | | |
| 2 | | | x | x | | |
| 3.1 | x | | | x | x | |
| 3.2 | x | | x | | x | |
| 3.3 | | | x | | x | |
| 3.4 | x | | x | | | |
| 3.5 | | | | | | x |
| 3.6 | | | | x | | x |
| 3.7 | x | | | | | x |
| 4.1 | x | x | x | | | |
| 4.2 | | x | | | x | |
| 4.3 | | x | x | | | x |
| 4.4 | | x | | | | |
| EDA-V | | | | x | | |
| E1 | | | | | | |
| E2 | | | | | | x |

Fig. 7

MOTOR VEHICLE TRANSMISSION

FIELD OF THE INVENTION

The invention relates generally to a transmission for a motor vehicle, including an electric motor or machine, an input shaft, an output shaft, and a first planetary gear set and a second planetary gear set. The planetary gear sets each include multiple elements. The transmission also includes a first, a second, a third, a fourth, and a fifth shift element. A rotor of the electric machine is connected to the input shaft, to the output shaft, or to at least one of the elements of the planetary gear sets.

BACKGROUND

In the case of hybrid vehicles, transmissions are known which include not only a gear set, but also one or multiple electric motors or machines. In this case, the transmission is usually configured to be multi-stage, i.e., multiple different transmission ratios can be selected, as gears, between an input shaft and an output shaft by actuating appropriate shift elements, wherein this is preferably automatically carried out. Depending on the arrangement of the shift elements, the shift elements are clutches or even brakes. The transmission is utilized in this case for suitably implementing an available tractive force of a drive machine of the motor vehicle with respect to various criteria. In this case, the gears of the transmission are mostly also utilized in conjunction with the at least one electric machine for implementing purely electric driving. Frequently, the at least one electric machine can also be incorporated in the transmission in order to implement various operating modes in different ways.

DE 10 2013 013 947 A1 describes a transmission for a motor vehicle, which is composed of two planetary gear sets and one electric machine. The two planetary gear sets are each formed by the elements sun gear, planet carrier, and ring gear, wherein, in addition, a total of five shift elements are provided, via which different power paths can be implemented via the planetary gear sets. In this way, multiple gears can be implemented between an input shaft and an output shaft of the transmission during driving with the aid of an upstream drive machine as well as via two gears during driving with the aid of the electric machine.

SUMMARY OF THE INVENTION

Example aspects of the present invention create an alternative embodiment to the transmission known from the prior art, with the aid of which different operating modes can be implemented in a suitable way, and which has a compact design.

According to the invention, a transmission includes an electric machine or motor, an input shaft, an output shaft, as well as a first planetary gear set and a second planetary gear set. The planetary gear sets include multiple elements in this case, wherein a first, a second, a third, a fourth, and a fifth shift element are provided, via the selective actuation of which different power paths can be implemented while shifting different gears. Moreover, a rotor of the electric machine is connected to the input shaft, to the output shaft, or to at least one of the elements of the planetary gear sets.

Within the meaning of the invention, a "shaft" is understood to be a rotatable component of the transmission, via which associated components of the transmission are rotationally fixed to each other or via which a connection of this type is established upon actuation of an appropriate shift element. The shaft can connect the components to each other axially or radially or even both axially and radially in this case. The respective shaft can therefore also be present as an intermediate piece, via which a respective component is connected, for example, radially.

Within the meaning of the invention, the term "axially" means in the direction of an axis, along which the planetary gear sets are arranged coaxially to each other. "Radially" is then understood to mean an orientation in the direction of the diameter of a shaft which lies on this axis.

Preferably, the output shaft of the transmission includes a tooth system, via which the output shaft is then operatively connected, in the motor vehicle drive train, to a differential gear arranged axially parallel to the output shaft. In this case, the tooth system is preferably provided on a mounting interface of the output shaft, wherein this mounting interface of the output shaft preferably lies axially at one end of the transmission, at which a mounting interface of the input shaft is also provided. This type of arrangement is particularly suitable for the application in a motor vehicle including a drive train aligned transversely to the direction of travel of the motor vehicle.

The planetary gear sets are preferably arranged in the sequence first planetary gear set and second planetary gear set axially subsequent to the mounting interface of the input shaft. Within the meaning of the invention, a different type of arrangement can also be implemented, however.

The invention now includes the technical teaching that the input shaft is rotationally fixed to the second element of the first planetary gear set and can be rotationally fixed to the first element of the second planetary gear set via the first shift element. Moreover, the first element of the first planetary gear set can be rotationally fixed, on the one hand, by the second shift element and, on the other hand, can be rotationally fixed to the first element of the second planetary gear set via the third shift element. The output shaft is rotationally fixed to the third element of the first planetary gear set and can be rotationally fixed to the second element of the second planetary gear set by the fourth shift element. Furthermore, the third element of the second planetary gear set is rotationally fixed, while two of the elements of the first planetary gear set can be rotationally fixed to each other via the fifth shift element.

In other words, the input shaft is therefore permanently rotationally fixed to the second element of the first planetary gear set, while the output shaft is continuously rotationally fixed to the third element of the first planetary gear set. In addition, the third element of the second planetary gear set is permanently rotationally fixed and, therefore, is continuously prevented from making a turning motion.

Upon actuation of the first shift element, the input shaft is rotationally fixed to the first element of the second planetary gear set, whereas the second shift element, in the engaged condition, rotationally fixes the first element of the first planetary gear set, and therefore the first element of the first planetary gear set is subsequently prevented from making a turning motion. An engagement of the third shift element results in a rotationally fixed connection of the first element of the first planetary gear set to the first element of the second planetary gear set, while the fourth shift element, in the engaged condition, rotationally fixes the output shaft and the second element of the second planetary gear set to each other. Finally, by engaging the fifth shift element, two of the elements of the first planetary gear set are rotationally fixed to each other, which results in an interlock of the first planetary gear set.

A respective rotationally fixed connection of the rotatable components of the transmission is preferably implemented, according to the invention, via one or even multiple intermediate shafts which can also be present, in this case, as short intermediate pieces when the components are positioned in a spatially dense manner. Specifically, the components which are permanently rotationally fixed to each other can each be present either as individual components which are rotationally fixed to each other, or even as single pieces. In the second case mentioned above, the respective components and the optionally present shaft are then formed by one common component, wherein this is implemented, in particular, when the respective components lie spatially close to each other in the transmission.

In the case of components of the transmission, which are connected to each other only upon actuation of a respective shift element, a connection is also preferably implemented via one or even multiple intermediate shafts.

A fixation takes place by way of a rotationally fixed connection to a rotationally fixed component of the transmission, which is preferably a permanently non-rotating component, preferably a housing of the transmission, a part of such a housing, or a component rotationally fixed thereto. In the present case, the third element of the second planetary gear set is permanently rotationally fixed and, therefore, is also continuously rotationally fixed to the non-rotating component.

In the case of the transmission, the first, the third, the fourth, and the fifth shift elements are present as clutches which, upon actuation, each synchronize the turning motions, if necessary, of the associated rotatable components of the transmission and subsequently rotationally fix these to each other. The second shift element is designed as a brake, however, which, upon actuation, brings the respective component to a standstill.

The fifth shift element, in the engaged condition, rotationally fixes two of the elements of the first planetary gear set to each other, wherein the possibilities within the scope of the invention are a rotationally fixed connection of the first element and the second element of the first planetary gear set, a rotationally fixed connection of the first element and the third element of the first planetary gear set, or a rotationally fixed connection of the second element and the third element of the first planetary gear set. In all three aforementioned cases, an interlock of the first planetary gear set is achieved.

Preferably, the first and the fifth shift elements are arranged axially between the first planetary gear set and the second planetary gear set, wherein, in this case, the fifth shift element lies, in particular, axially between the first planetary gear set and the first shift element. Moreover, the second shift element and the third shift element are preferably provided axially on a side of the second planetary gear set facing away from the mounting interface of the input shaft. In this case, the third shift element is provided, in particular, axially between the second planetary gear set and the second shift element. Finally, the fourth shift element is preferably placed axially between the first planetary gear set and the second planetary gear set and, in particular, lies directly adjacent to the second planetary gear set.

On the input side, a separating clutch can also be provided, which, in the actuated condition, rotationally fixes the input shaft to a connecting shaft which, in turn, is coupled to the drive machine connected upstream from the transmission. This separating clutch can be designed, in principle, as a friction-locking or even as a form-fit shift element in this case, although it is particularly preferred when said separating clutch is present as a friction clutch.

In all, a transmission according to the invention is distinguished by a compact design, low component loads, good gearing efficiency, and low losses.

In the case of the transmission according to the invention, four gears can be implemented between the input shaft and the output shaft by selectively engaging two shift elements in each case. In this case, a first gear between the input shaft and the output shaft is obtained by actuating the first and the fourth shift elements, while a second gear between the input shaft and the output shaft can be implemented by engaging the third and the fourth shift elements. Furthermore, in a first variant, a third gear between the input shaft and the output shaft can be selected by actuating the fourth and the fifth shift elements. In addition, the third gear can also be implemented, in a second variant, by engaging the first and the fifth shift elements, in a third variant by actuating the third and the fifth shift elements and, in a fourth variant, by engaging the first and the third shift elements. Finally, a fourth gear between the input shaft and the output shaft is obtained, in a first variant, by engaging the second and the fourth shift elements, in a second variant by actuating the first and the second shift elements and, in a third variant, by engaging the second and the third shift elements.

By a suitable selection of stationary transmission ratios of the planetary gear sets, a transmission ratio range which is suitable for the application in the case of a motor vehicle is therefore implemented. In this case, gear shifts between the gears can be implemented, in which only the condition of two shift elements is to be changed in each case, in that one of the shift elements contributing to the previous gear is to be disengaged and another shift element for implementing the subsequent gear is to be engaged. As a further consequence thereof, a shift between the gears can take place very rapidly.

According to one embodiment of the invention, the rotor of the electric machine is continuously connected to the first element of the second planetary gear set. This arrangement of the electric machine in the transmission is advantageous, since it allows different operating modes to be implemented in an easy way:

A first gear between the first element of the second planetary gear set and, therefore, the rotor and the output shaft can be utilized for purely electric driving. In this case, this first gear is obtained by engaging the fourth shift element, and therefore the electric machine is connected to the output shaft with a constant ratio by way of the rotationally fixed connection of the second element of the second planetary gear set and the output shaft. In this case, a ratio of the first gear corresponds to a ratio of the first gear which is active between the input shaft and the output shaft.

Since yet another shift element is always to be engaged for driving with the aid of a drive machine connected upstream from the transmission, driving with the aid of the electric machine can be implemented in this case without the drive machine being coupled. Originating from this purely electric driving, the upstream drive machine can then be started into the first gear which is active between the input shaft and the output shaft, into the second gear which is active between the input shaft and the output shaft, into the first variant of the third gear which is active between the input shaft and the output shaft, and into the first variant of the fourth gear which is active between the input shaft and the output shaft, since the fourth shift element contributes to each of these gears.

As yet another operating mode, a charging operation of an electric accumulator can also be implemented, in that only the first shift element is engaged and, therefore, a connection of the input shaft to the electric machine is established and, therefore, a connection of the upstream drive machine to the electric machine is also established. At the same time, a force-fit connection to the output shaft is not established, and therefore the transmission is in a neutral position. Apart from a charging operation, a start of the upstream drive machine via the electric machine can also be implemented as a result.

Since the electric machine is coupled to the output shaft in the engaged condition of the fourth element, power shifts can also be implemented, in which support via the electric machine can take place as part of every gear shift. In this case, the synchronization of the shift element to be engaged during a gear shift can take place by closed-loop control of the rotational speed of the upstream drive machine or by synchronized shift elements or even by another, separate synchronizing mechanism, such as a transmission brake or even by yet another electric machine. If a separating clutch is also provided on the input side of the input shaft, the inertial mass of the upstream drive machine can be decoupled during the synchronization.

Specifically, gear shifts between the first gear which is active between the input shaft and the output shaft and the second gear which is active between the input shaft and the output shaft can be implemented under load in this case with the fourth shift element engaged. The same is possible in the case of power shifts between the second gear which is active between the input shaft and the output shaft and the first variant of the third gear which is active between the input shaft and the output shaft. Furthermore, power shifts between the first variant of the third gear which is active between the input shaft and the output shaft and the first variant of the fourth gear which is active between the input shaft and the output shaft can be implemented in the engaged condition of the fourth shift element.

The transmission according to the invention can also be operated in such a way that a rotational-speed reduction of the electric machine is achieved during driving. For example, it is possible to initially drive in a hybrid manner in the first variant of the fourth gear, in that the fourth shift element initially remains engaged either after a gear shift from the third gear into the fourth gear with torque support via the electric machine or after a start of the drive machine into the fourth gear. In order to now reduce a rotational speed of the electric machine in the fourth gear at higher ground speeds, however, a change-over can be carried out from the first variant of the fourth gear into the second variant of the fourth gear, since the rotor of the electric machine has a lower rotational speed here than in the first variant of the fourth gear. This change-over takes place while obtaining the tractive force via the upstream drive machine. Initially, the load-free, fourth shift element is disengaged and, subsequent thereto, the load-free, first shift element is engaged, wherein the rotational-speed adjustment takes place in this case by closed-loop control of the rotational speed of the electric machine. If a separating clutch is also provided, via which the input shaft can be connected on the input side to a connecting shaft, the upstream drive machine can also be decoupled in the second variant of the fourth gear. The latter is useful when a recuperation is to take place via the electric machine also originating at higher ground speeds and, in so doing, the drive machine is to be decoupled and switched off.

As yet another operating mode, a starting mode for forward travel can also be implemented during driving with the aid of the input shaft and, therefore, with the aid of the upstream drive machine. For this purpose, the third shift element is engaged, and therefore the drive machine drives via the second element of the first planetary gear set and, simultaneously, the electric machine provides support at the first element of the first planetary gear set, while an output takes place via the third element of the first planetary gear set. By supporting the torque with the aid of the electric machine, a starting operation for forward travel can be implemented.

Within the meaning of the invention, a "connection" of the rotor of the electric machine to the respective component of the transmission is to be understood as a coupling between them, and therefore a constant rotational-speed dependence prevails between the rotor of the electric machine and the respective component. In the preferred embodiment of the invention, this connection exists permanently between the rotor and the first element of the second planetary gear set. In this case, the electric machine can be arranged either coaxially to the planetary gear sets or so as to lie axially offset with respect thereto. In the former case, the rotor of the electric machine can either be rotationally fixed directly to the component or can be coupled thereto via one or even multiple intermediate transmission ratio steps, wherein the latter allows for a more favorable configuration of the electric machine with higher rotational speeds and a lower torque. The at least one transmission ratio step can be designed as a spur gear stage and/or as a planetary gear stage in this case.

If the electric machine is provided so as to be axially offset with respect to the planetary gear sets, however, a coupling takes place via one or multiple intermediate transmission ratio steps and/or a flexible traction drive mechanism. The one or multiple transmission ratio steps can also be implemented individually, in this case, as a spur gear stage or as a planetary gear stage. A flexible traction drive mechanism can be either a belt drive or a chain drive.

According to yet another design option of the invention, precisely one electric machine is provided, which is configured for driving the output shaft. In this case, the transmission according to the invention therefore includes only one electric machine which can also function as a drive of the output shaft, wherein said electric machine is then preferably continuously connected to the first element of the second planetary gear set. This has the advantage that a compact design and low manufacturing effort for the transmission can therefore be achieved.

Alternatively thereto, a second electric machine can be provided, the rotor of which is continuously connected to the input shaft. The functionality of the transmission can be further increased by such an embodiment.

According to yet another design option of the invention, the output shaft can also be rotationally fixed to the first element of the second planetary gear stage by a sixth shift element. Yet another sixth shift element is therefore provided in this case, which, in the engaged condition, rotationally fixes the output shaft and the first element of the second planetary gear set to each other. It is particularly preferred when this sixth shift element is provided axially between the first planetary gear set and the second planetary gear set and, in this case, lies, in particular, axially between the first shift element and the fourth shift element.

By providing the additional, sixth shift element, further variants of the third gear which is active between the input shaft and the output shaft can then be implemented in the transmission according to the invention. In addition, yet another additional variant can be implemented in the case of the fourth gear which is active between the input shaft and the output shaft. The third gear, which is active between the input shaft and the output shaft, is obtained in a fifth variant by engaging the third and the sixth shift elements, in a sixth variant by actuating the fifth and the sixth shift elements, and in a seventh variant by engaging the first and the sixth shift elements. In addition, the fourth gear, which is active between the input shaft and the output shaft, can be implemented in a fourth variant by actuating the second and the sixth shift elements.

In addition, when the rotor of the electric machine is connected to the first element of the second planetary gear set, a second gear can also be implemented, which is active between the first element of the second planetary gear set—and, therefore, also the rotor of the electric machine—and the output shaft. This second gear is selected, in this case, by engaging the sixth shift element, and therefore the electric machine is directly connected to the output shaft. A transmission ratio of this second gear corresponds, in this case, to a transmission ratio of the third gear which is active between the input shaft and the output shaft. Originating from the second gear, a start of the upstream drive machine into the fifth variant, the sixth variant, and the seventh variant of the third gear and into the fourth variant of the fourth gear can then be implemented, since the sixth shift element also contributes to each of these gears.

Furthermore, the transmission according to the invention can also be operated, when the sixth shift element is provided, in such a way that a rotational-speed reduction of the electric machine is achieved during driving. It is therefore possible to initially drive in a hybrid manner in the first variant of the fourth gear which is active between the input shaft and the output shaft, in that the fourth shift element initially remains engaged either after a gear shift from the third gear into the fourth gear with torque support via the electric machine or after a start of the drive machine into the fourth gear. In order to then reduce a rotational speed of the electric machine in the fourth gear at higher ground speeds, however, a change-over can be carried out from the first variant of the fourth gear into the fourth variant of the fourth gear, since the rotor of the electric machine has a lower rotational speed here than in the first variant of the fourth gear. This change-over takes place while obtaining the tractive force via the upstream drive machine. Initially, the load-free, fourth shift element is disengaged and, subsequent thereto, the load-free, sixth shift element is engaged, wherein the rotational-speed adjustment takes place in this case by closed-loop control of the rotational speed of the electric machine.

A separating clutch is not required for decoupling the upstream drive machine in this case, since the upstream drive machine can be decoupled, in the fourth variant of the fourth gear which is active between the input shaft and the output shaft, by disengaging the second shift element. As a result, the second gear is then implemented, which is active between the first element of the second planetary gear set and the output shaft.

In one refinement of the invention, one or multiple shift elements are each implemented as a form-fit shift element. In this case, the respective shift element is preferably designed either as a constant-mesh shift element or as a lock-synchronizer mechanism. Form-fit shift elements have the advantage over friction-locking shift elements that lower drag losses occur in the disengaged condition, and therefore a better efficiency of the transmission can be achieved. In particular, in the transmission according to the invention, all shift elements are implemented as form-fit shift elements, and therefore the lowest possible drag losses can be achieved.

Within the scope of the invention, the two planetary gear sets can each be present as a negative or minus planetary gear set, wherein the first element of the respective planetary gear set is a sun gear, the second element of the respective planetary gear set is a planet carrier, and the third element of the respective planetary gear set is a ring gear. *A minus planetary gear set* is composed, in a way known, in principle, to a person skilled in the art, of the elements sun gear, planet carrier, and ring gear, wherein the planet carrier guides, in a rotatably mounted manner, at least one planet gear, although preferably multiple planet gears which each individually intermesh with the sun gear as well as with the surrounding ring gear.

Alternatively thereto, one planetary gear set or even both planetary gear sets could also be present as a positive or plus planetary gear set, provided this is permitted by the connection of the respective elements, wherein the first element of the respective planetary gear set is then a sun gear, the second element of the respective planetary gear set is a ring gear, and the third element of the respective planetary gear set is a planet carrier. In a plus planetary gear set as well, the elements sun gear, ring gear, and planet carrier are present, wherein the latter guides at least one pair of planet gears, in which the one planet gear is meshed with the internal sun gear and the other planet gear is meshed with the surrounding ring gear, and the planet gears are intermeshed with each other.

Where permitted by a connection of the individual elements, a minus planetary gear set can be converted into a plus planetary gear set, wherein, as compared to the design as a minus planetary gear set, the ring gear connection and the planet carrier connection are then to be interchanged, and a stationary transmission ratio is to be increased by one. Conversely, a plus planetary gear set could also be replaced by a minus planetary gear set, provided the connection of the elements of the transmission enables this. In this case, as compared to the plus planetary gear set, the ring gear connection and the planet carrier connection would also need to be interchanged, and a stationary transmission ratio would need to be reduced by one. According to a first variant of the invention, both planetary gear sets are designed as minus planetary gear sets. According to an alternative, second variant, the first planetary gear set is then present as a minus planetary gear set, however, while the second planetary gear set is designed as a plus planetary gear set.

In one refinement of the invention, at least two shift elements are combined to form one pair of shift elements in each case, and one actuating element is associated with each pair of shift elements, wherein the one shift element, on the one hand, and the other shift element, on the other hand, of the respective pair of shift elements can be actuated from a respective neutral position via the respective one actuating element. This is implemented in shift elements of the transmission, which include a common shaft and are not simultaneously actuated in a gear, and has the advantage that, as a result, the number of actuating elements can be reduced and, therefore, the manufacturing effort can be reduced.

Depending on the specific embodiment of the transmission, the first and the fifth shift elements and/or the second and the third shift elements and/or the first and the third shift elements and/or the second and the fifth shift elements and/or the fourth and the sixth shift elements can be combined in pairs and can each include one common actuating element.

Within the scope of the invention, a starting component can be installed upstream from the transmission, for example a hydrodynamic torque converter or a friction clutch. This starting component can then also be an integral part of the transmission and acts to configure a starting process, in that the starting component enables a slip speed between the internal combustion engine and the input shaft of the transmission. In this case, one of the shift elements of the transmission or the separating clutch, which may be present, can also be designed as such a starting component, in that it is present as a frictional shift element. In addition, a one-way clutch with respect to the transmission housing or to another shaft can be disposed on each shaft of the transmission, in principle.

The transmission according to the invention is, in particular, part of a motor vehicle drive train for a hybrid vehicle and is then arranged between a drive machine of the motor vehicle, which is configured, in particular, as an internal combustion engine, and further components of the drive train, which are arranged downstream in the direction of power flow to driving wheels of the motor vehicle. In this case, the input shaft of the transmission is either permanently coupled to a crankshaft of the internal combustion engine in a rotationally fixed manner or can be connected thereto via an intermediate separating clutch or a starting component, wherein a torsional vibration damper can also be provided between the internal combustion engine and the transmission. On the output end, the transmission is then preferably coupled, within the motor vehicle drive train, to a differential gear of a drive axle of the motor vehicle, wherein a connection to an interaxle differential can also be present in this case, however, via which a distribution to multiple driven axles of the motor vehicle takes place. The differential gear or the interaxle differential can be arranged with the transmission in one common housing in this case. A torsional vibration damper can also be integrated into this housing.

Within the meaning of the invention, the expressions that two components of the transmission are "connected" or "coupled" in a rotationally fixed manner or "are connected to each other" mean a permanent coupling of these components, and therefore said components cannot rotate independently of each other. In that respect, no shift element is provided between these components, which can be elements of the planetary gear sets and/or even shafts and/or a rotationally fixed component of the transmission. Instead, the corresponding components are rigidly connected to each other.

However, if a shift element is provided between two components, these components are not permanently coupled to each other in a rotationally fixed manner. Instead, a rotationally fixed coupling is carried out only by actuating the intermediate shift element. In this case, an actuation of the shift element means, within the meaning of the invention, that the respective shift element is transferred into an engaged condition and consequently synchronizes the turning motions of the components coupled directly thereto. In the case of an embodiment of the respective shift element as a form-fit shift element, the components directly connected to each other in a rotationally fixed manner via the shift element rotate at the same rotational speed, while, in the case of a friction-locking shift element, speed differences can exist between the components even after an actuation of said shift element. This intentional or even unintentional condition is nevertheless referred to, within the scope of the invention, as a rotationally fixed connection of the respective components via the shift element.

The invention is not limited to the specified combination of features of the main claim or the claims dependent thereon. In addition, individual features can be combined with one another, provided they arise from the claims, the description of preferred embodiments of the invention which follows, or directly from the drawings. References in the claims to the drawings via the use of reference characters is not intended to limit the scope of protection of the claims.

BRIEF DESCRIPTION OF THE DRAWINGS

Advantageous embodiments of the invention, which are explained in the following, are represented in the drawings. In the drawings:

FIG. 4 shows an exemplary shift pattern of the transmissions from FIGS. 2 and 3;

FIG. 7 shows an exemplary shift pattern of the transmissions from FIGS. 5 and 6;

DETAILED DESCRIPTION

Figure 1:
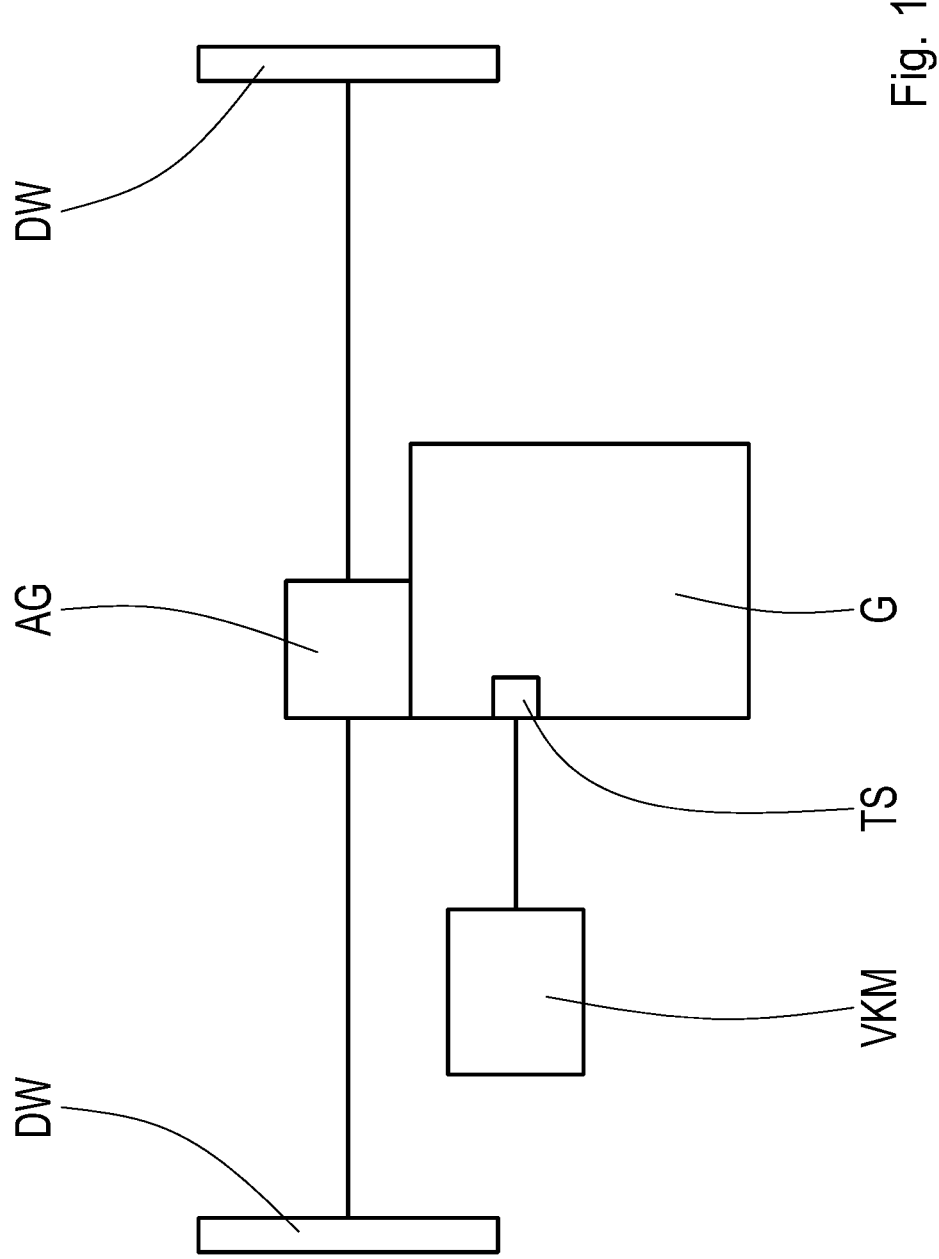
FIG. 1 shows a schematic view of a motor vehicle drive train in which a transmission according to the invention is utilized.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic view of a motor vehicle drive train of a hybrid vehicle, wherein, in the motor vehicle drive train, an internal combustion engine VKM is connected to a transmission G via an intermediate torsional vibration damper TS. Connected downstream from the transmission G, on the output end thereof, is a differential gear AG, via which drive power is distributed to driving wheels DW on a drive axle of the motor vehicle. The transmission G and the torsional vibration damper TS are arranged in a common housing of the transmission G in this case, into which the differential gear AG can also be integrated. As is also apparent in FIG. 1, the internal combustion engine VKM, the torsional vibration damper TS, the transmission G, and the differential gear AG are aligned transversely to a direction of travel of the motor vehicle.

Figure 2:
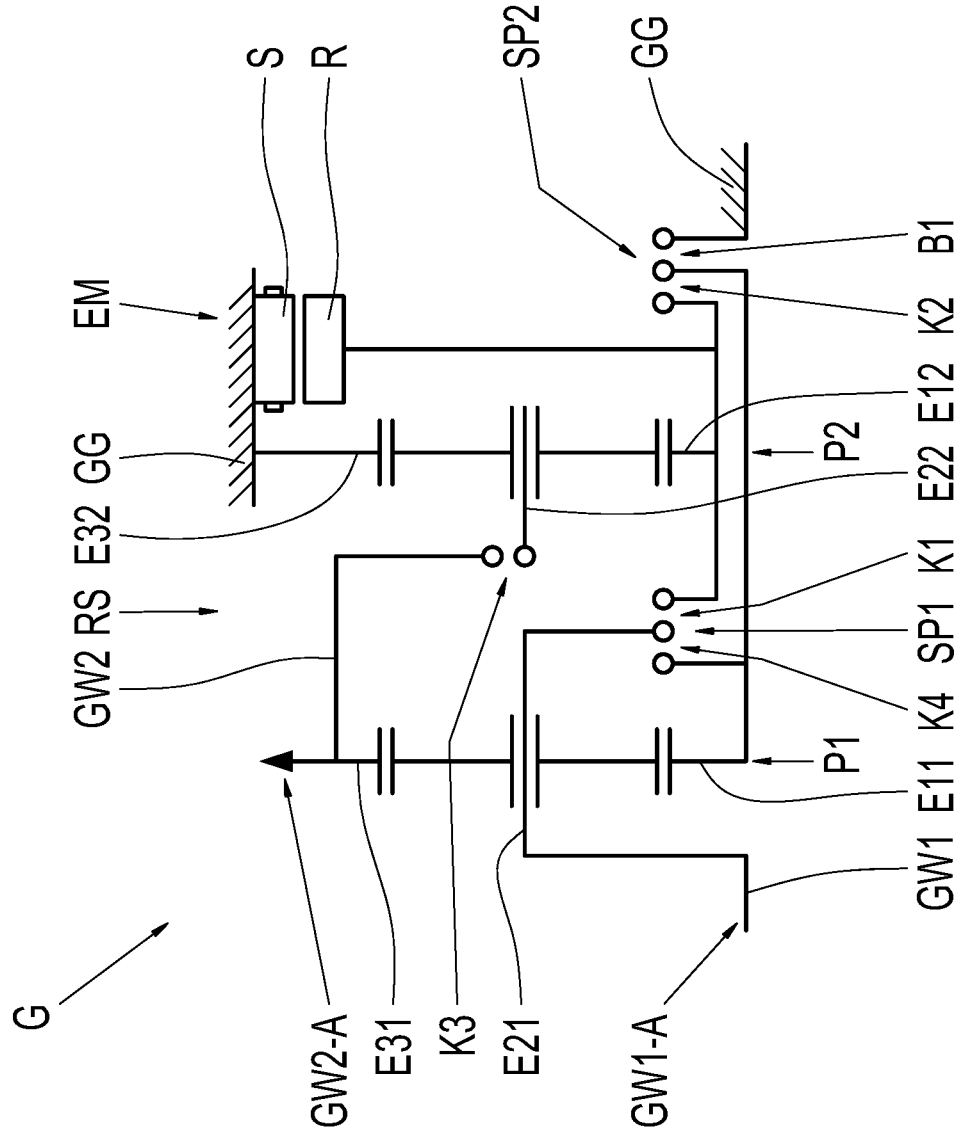
FIG. 2 shows a schematic view of a transmission according to a first example embodiment of the invention.

FIG. 2 shows a schematic of the transmission G according to a first example embodiment of the invention. As is apparent, the transmission G is composed of a gear set RS and the electric motor or machine EM, which are both arranged in the housing of the transmission G. The gear set RS includes two planetary gear sets P1 and P2, wherein each of the planetary gear sets P1 and P2 includes a first element E11 and E12, respectively, a second element E21 and E22, respectively, and a third element E31 and E32, respectively. The first element E11 and E12 is formed by a sun gear of the planetary gear set P1 and P2, respectively, while the second element E21 and E22 of the planetary gear set P1 and P2, respectively, is present as a planet carrier and the third element E31 and E32 of the planetary gear set P1 and P2, respectively, is present as a ring gear.

In the present case, the two planetary gear sets P1 and P2 are therefore presented as negative or minus planetary gear sets. At least one planet gear of the respective planet carrier of said minus planetary gear sets guides in a rotatably mounted manner and is meshed with the respective radially internal sun gear as well as with the respective radially surrounding ring gear. It is particularly preferred, however, when both planetary gear sets P1 and P2 include multiple planet gears.

Provided this is permitted by the connection, one or both of the planetary gear sets P1 and P2 could be designed as a positive or plus planetary gear set, however, wherein, as compared to the design as a minus planetary gear set, the second element E21 and E22, respectively, is then formed by the respective ring gear and the third element E31 and E32, respectively, is formed by the respective planet carrier and, in addition, a stationary transmission ratio must be increased by one. In the case of a plus planetary gear set, the respective planet carrier then guides at least one pair of planet gears. One planet gear of said pair of planet gears is meshed with the respective radially internal sun gear and one planet gear is meshed with the respective radially surrounding ring gear, and the planet gears intermesh with each other.

As is apparent in FIG. 2, the transmission G includes a total of five shift elements in the form of a first shift element K1, a second shift element B1, a third shift element K2, a fourth shift element K3, and a fifth shift element K4. In this case, the shift elements K1, B1, K2, K3 and K4 are each designed as form-fit shift elements and are present preferably as constant-mesh shift elements. In addition, the first shift element K1, the third shift element K2, the fourth shift element K3, and the fifth shift element K4 are designed a clutches in this case, while the second shift element B1 is present as a brake.

An input shaft GW1 of the transmission G is rotationally fixed to the second element E21 of the first planetary gear set P1 and can be rotationally fixed to the first element E12 of the second planetary gear set P2 by the first shift element K1. The first element E12 of the second planetary gear set P2 is continuously rotationally fixed to a rotor R of the electric machine EM, which is arranged coaxially to the planetary gear sets P1 and P2, and the stator S of which is rotationally fixed to a rotationally fixed component GG of the transmission G. In the present case, the rotationally fixed component GG is, in particular, the housing or a part of the housing of the transmission G. In addition, the first element E12 of the second planetary gear set P2 can also be rotationally fixed to the first element E11 of the first planetary gear set P1 by engaging the third shift element K2, wherein the first element E11 of the first planetary gear set P1 can also be rotationally fixed to the rotationally fixed component GG by the second shift element B1.

As is also apparent from FIG. 2, an output shaft GW2 of the transmission G is permanently rotationally fixed to the third element E31 of the first planetary gear set P1 and can be rotationally fixed to the second element E22 of the second planetary gear set P2 by engaging the fourth shift element K3. However, the third element E32 of the second planetary gear set P2 is permanently rotationally fixed to the rotationally fixed component GG. Finally, the first element E11 and the second element E21 of the first planetary gear set P1 are also rotationally fixed to each other by actuating the fifth shift element K3, which results in an interlock of the first planetary gear set P1.

The input shaft GW1 as well as the output shaft GW2 form a mounting interface GW1-A and GW2-A, respectively, wherein the mounting interface GW1-A in the motor vehicle drive train from FIG. 1 is utilized for connecting to the internal combustion engine VKM, while the transmission G is connected at the mounting interface GW2-A to the downstream differential gear AG. The mounting interface GW1-A of the input shaft GW1 is formed on an axial end of the transmission G in this case, while the mounting interface GW2-A of the output shaft GW2 lies in a gear plane of the first planetary gear set P1 and, as a result, is aligned transversely to the mounting interface GW1-A of the input shaft GW1. The two planetary gear sets P1 and P2 are arranged in the sequence first planetary gear set P1 and second planetary gear set P2 axially subsequent to the mounting interface GW1-A of the input shaft GW1.

As is also clear from FIG. 2, the first shift element K1 and the fifth shift element K3 are placed axially between the first planetary gear set P1 and the second planetary gear set P2, wherein the first shift element K1 and the fifth shift element K3 are arranged axially directly next to each other and the fifth shift element K3 lies axially between the first planetary gear set P1 and the first shift element K1. In addition, the first shift element K1 and the fifth shift element K3 include a common actuating element (not represented further here), by which the first shift element K1, on the one hand, and the fifth shift element K3, on the other hand, can be actuated, originating from a neutral position. In that respect, the first shift element K1 and the fifth shift element K3 are combined to form one shift-element pair SP1.

However, the second shift element B1 and the third shift element K2 are provided axially on a side of the second planetary gear set P2 facing away from the mounting interface GW1-A, wherein the third shift element K2 lies axially between the second planetary gear set P2 and the second shift element B1. In addition, the second shift element B1 and the third shift element K2 are also combined to form one shift-element pair SP2, in that an actuating element (which is also not represented in greater detail) is provided, by which the second shift element B1, on the one hand, and the third shift element K2, on the other hand, can be actuated, originating from a neutral position. The electric machine EM is axially incorporated between the third shift element K2 and the second planetary gear set P2, in that the rotationally fixed connection to the first element E12 of the second planetary gear set P2 is established here. Finally, the fourth shift element K3 is provided axially between the first planetary gear set P1 and the second planetary gear set P2 and, in this case, lies axially directly adjacent to the second planetary gear set P2.

Figure 3:
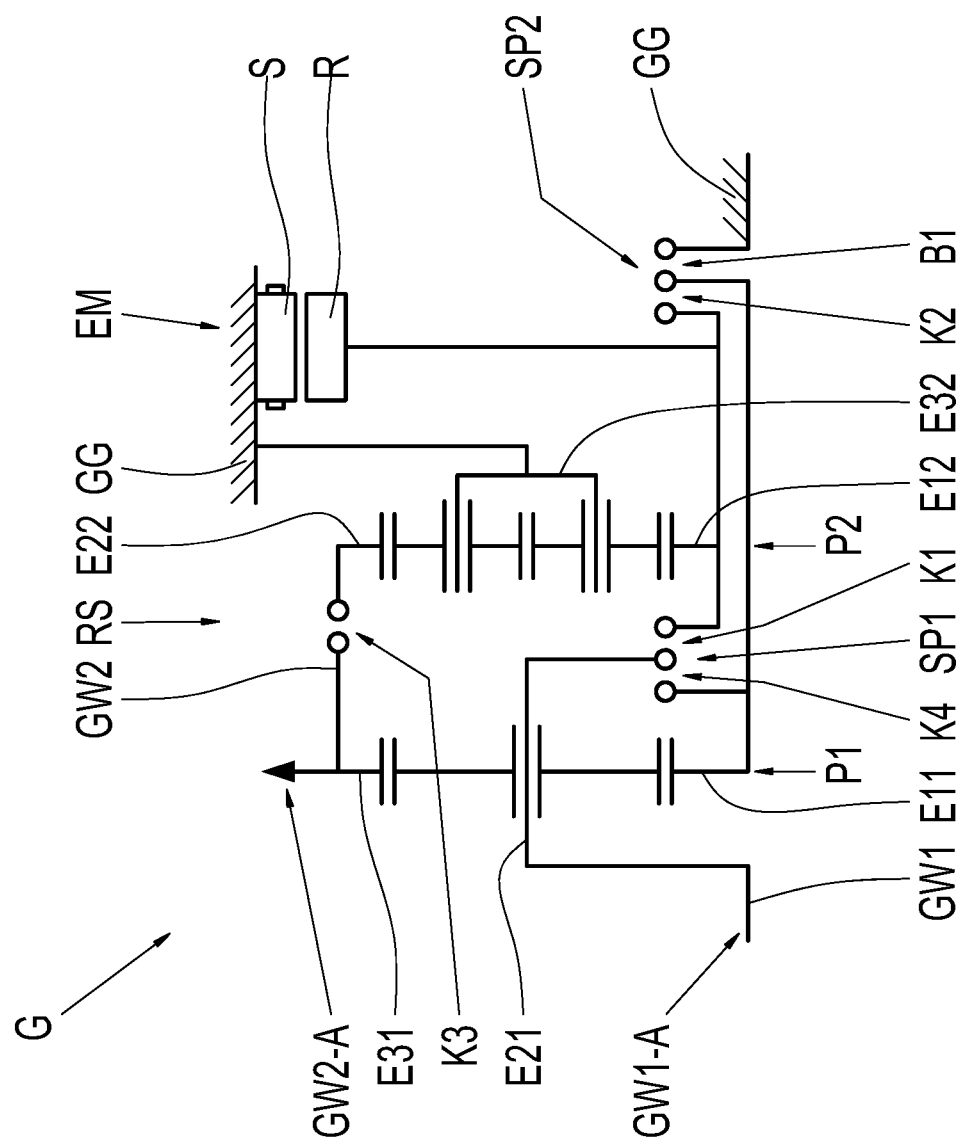
FIG. 3 shows a schematic of a transmission according to a second example embodiment of the invention.

FIG. 3 also shows a schematic of a transmission G according to a second embodiment of the invention, which essentially corresponds to the preceding variant according to FIG. 2. The difference, however, is that the second element E22 of the second planetary gear set P2 is now formed by the ring gear and the third element E32 of the second planetary gear set P2 is formed by the planet carrier. Therefore, the second planetary gear set P2 is designed as a plus planetary gear set in this case, wherein the fourth shift element K3 is now provided radially further outward as compared to the preceding variant according to FIG. 2. For the rest, the embodiment according to FIG. 3 corresponds to the preceding variant according to FIG. 2, and therefore reference is made to the description thereof.

FIG. 4 shows an exemplary shift pattern for the transmissions G from FIGS. 2 and 3 in table form. As is apparent, a total of four gears 1 to 4.3 can be implemented between the input shaft GW1 and the output shaft GW2 in this case, wherein, in the columns of the shift pattern, an X indicates which of the shift elements K1, B1, K2, K3 and K4 is engaged in which of the gears 1 to 4.3. Two of the shift elements K1, B1, K2, K3 and K4 are closed in each of the gears 1 to 4.3 in each case.

As is apparent in FIG. 4, a first gear 1 between the input shaft GW1 and the output shaft GW2 is selected by actuating the first shift element K1 and the fourth shift element K3, wherein, originating therefrom, a second gear 2 is formed, which is active between the input shaft GW1 and the output shaft GW2, in that the first shift element K1 is disengaged and the third shift element K2 is engaged. Moreover, in a first variant 3.1, a third gear, which is active between the input shaft GW1 and the output shaft GW2, can then be selected, in that the third shift element K2 is disengaged and, subsequent thereto, the fifth shift element K4 is engaged. The third gear can also be implemented in a second variant 3.2 by actuating the first shift element K1 and the fifth shift element K4, in a third variant 3.3 by engaging the third shift element K2 and the fifth shift element K4, and in a fourth variant 3.4 by actuating the first shift element K1 and the third shift element K2.

Moreover, a fourth gear, which is active between the input shaft GW1 and the output shaft GW2, results in a first variant 4.1 by actuating the second shift element B1 and the fourth shift element K3, wherein the fourth gear can also be implemented in a second variant 4.2 by engaging the first shift element K1 and the second shift element B1, and in a third variant 4.3 by actuating the second shift element B1 and the third shift element K2.

Although the shift elements K1, B1, K2, K3 and K4 are each designed as form-fit shift elements, a power shift can be implemented between the first gear 1 and the second gear 2, between the second gear 2 and the first variant 3.1 of the third gear, and between the first variant 3.1 of the third gear and the first variant 4.1 of the fourth gear. The reason therefor is that the fourth shift element K3 contributes to all these gears, and therefore the output can be supported by the electric machine EM during the gear shifts, since said electric machine is coupled to the output shaft GW2 via the second planetary gear set P2 in the engaged state of the fourth shift element K3. A synchronization during the gear shifts can take place, in this case, by an appropriate closed-loop control of the upstream internal combustion engine VKM, and therefore the respective shift element to be disengaged is disengaged without load and the shift element to be subsequently engaged can be engaged without load.

The transmissions G from FIGS. 2 and 3 can also be operated in alternative operating modes with the aid of the electric machine EM: For example, purely electric driving can take place in a first gear E1 which is active between the rotor R of the electric machine EM and the output shaft GW2, and which is implemented by transferring the fourth shift element K3 into an engaged condition, as is clear from FIG. 4. This is the case because, in the engaged condition of the fourth shift element K3, the electric machine EM is connected to the output shaft GW2 via the second planetary gear set P2 with a constant ratio, wherein the ratio of the first gear E1 corresponds to the ratio of the first gear 1 which is active between the input shaft GW1 and the output shaft GW2.

Advantageously, originating from the first gear E1, a start of the internal combustion engine VKM into one of the gears 1, 2, 3.1 and 4.1 can be carried out, since the fourth shift element K3 is engaged in each of these gears. Therefore, a transition from purely electric driving into driving via the internal combustion engine or into hybrid driving can be carried out rapidly.

Moreover, a charging or start function can be implemented by engaging the first shift element K1. This is the case because, in the engaged condition of the first shift element K1, the electric machine EM is directly coupled to the input shaft GW1 and, therefore, also to the internal combustion engine VKM. At the same time, there is no force-fit connection to the output shaft GW2, however, wherein the input shaft GW1 and the rotor R run at the same rotational speed in this case. When the electric machine EM is operated as a generator, an electric accumulator can be charged via the internal combustion engine VKM, whereas, when the electric machine EM is operated as an electric motor, a start of the internal combustion engine VKM can be implemented via the electric machine EM.

A starting function for forward travel EDA-V can also be implemented as yet another operating mode. For this purpose, the third shift element K2 is to be engaged, whereby driving takes place via the input shaft GW1 by the second element E21 of the first planetary gear set P1, while the electric machine EM can support the torque of the internal combustion engine VKM at the first element E11 of the first planetary gear set P1. An output to the output shaft GW2 then takes place via the third element E31 of the first planetary gear set P1. As a result, a starting operation for forward travel can be implemented.

Finally, a rotational-speed reduction of the electric machine EM can also be configured in the mechanical or hybrid mode: After a gear shift from the third gear into the fourth gear, with torque support via the electric machine EM, or after a start of the internal combustion engine VKM into the fourth gear, hybrid driving in the fourth gear 4.1 results. In order to reduce the rotational speed of the electric machine EM in the fourth gear at higher ground speeds, a change-over can be carried out from the first variant 4.1 of the fourth gear into the second variant 4.2 of the fourth gear, in which the rotor R has a lower rotational speed. This change-over takes place while obtaining the tractive force via the internal combustion engine VKM. For this purpose, the load-free, fourth shift element K3 is then disengaged and the load-free, first shift element K1 is engaged, wherein the rotational-speed adjustment takes place in each case by closed-loop control of the rotational speed of the electric machine EM.

Figure 5:
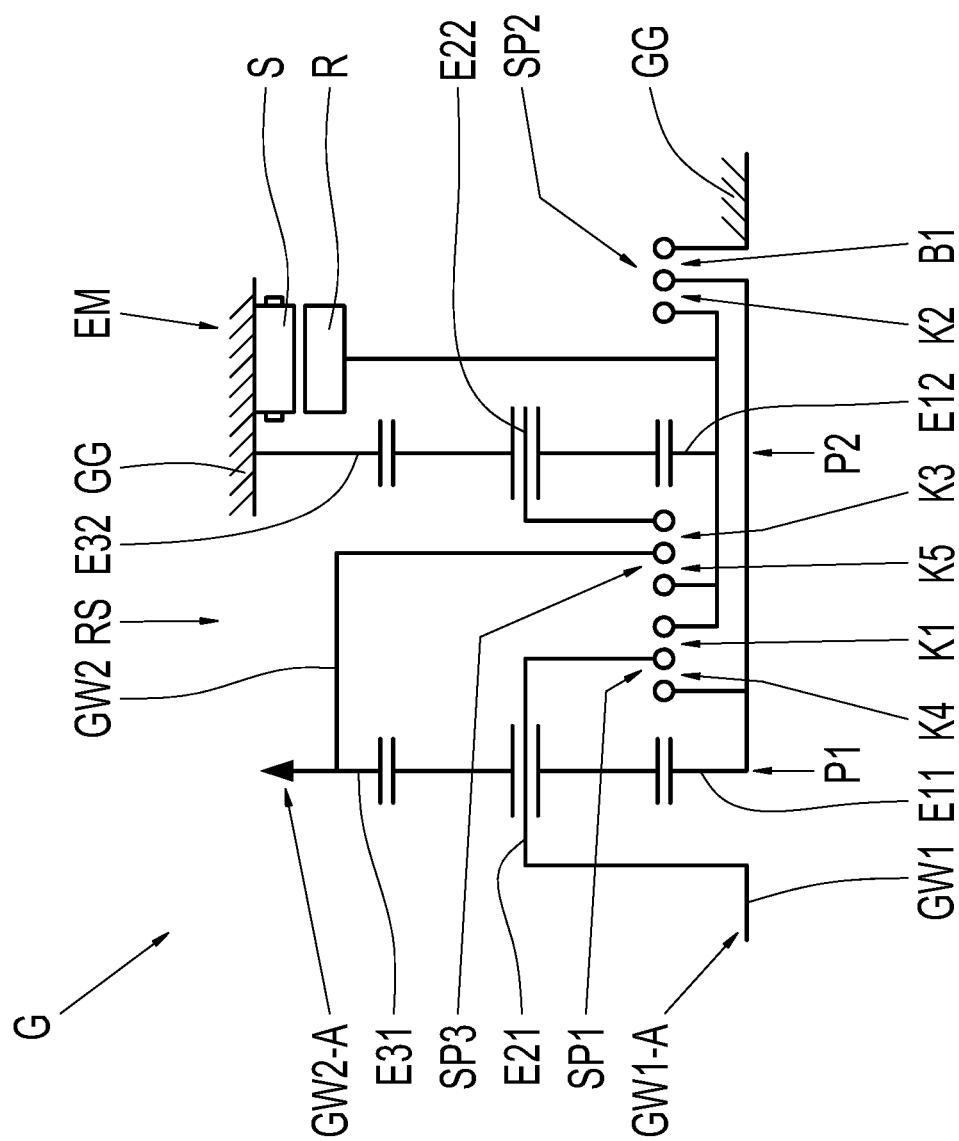
FIG. 5 shows a schematic view of a transmission according to a third example embodiment of the invention.

Furthermore, FIG. 5 shows a schematic of a transmission G according to a fourth embodiment of the invention. This embodiment as well corresponds, again largely, to the variant from FIG. 2, wherein, in contrast thereto, however, a sixth shift element K5 is additionally provided, which, in the actuated condition, rotationally fixes the output shaft GW2 to the first element E12 of the second planetary gear set P2 and, therefore, also to the rotor R of the electric machine EM. The sixth shift element K5, which is configured as a clutch in this case, is provided axially between the first shift element K1 and the fourth shift element K3 in this case, wherein the sixth shift element K5 is placed axially directly adjacent to the fourth shift element K3 in this case. In this case, the fourth shift element K3 and the sixth shift element K5 are combined to form one shift-element pair SP3, in that associated with the fourth shift element K3 and the sixth shift element K5 is a common actuating element (not represented), by which the fourth shift element K3, on the one hand, and the sixth shift element K5, on the other hand, can be actuated, originating from a neutral position. For the rest, the embodiment according to FIG. 5 corresponds to the variant according to FIG. 2, and therefore reference is made to the description thereof.

Figure 6:
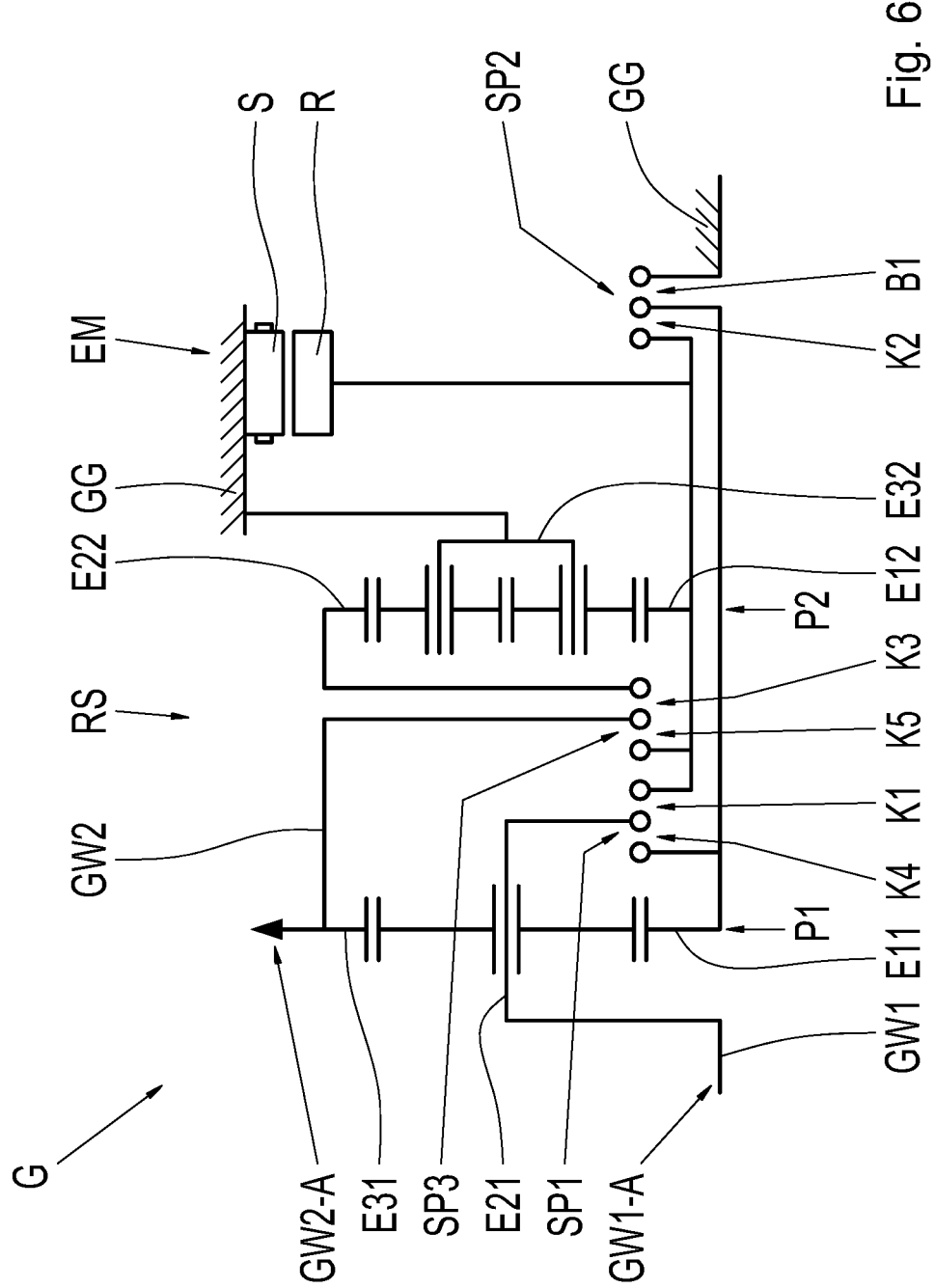
FIG. 6 shows a schematic of a transmission according to a fourth example embodiment of the invention.

Furthermore, a schematic view of a transmission G according to a fifth design option of the invention is represented in FIG. 6, wherein this design option largely corresponds to the preceding variant from FIG. 5. The only difference in this case is that the second planetary gear set P2 is now designed as a plus planetary gear set, in that the second element E22 of the second planetary gear set P2 is formed by the ring gear and the third element E32 of the second planetary gear set P2 is formed by the planet carrier. Otherwise, the design option according to FIG. 6 corresponds to the preceding variant according to FIG. 5, and therefore reference is made to the description thereof.

In FIG. 7, an exemplary shift pattern of the transmissions G from FIGS. 5 and 6 is represented, wherein this shift pattern essentially corresponds to the shift pattern from FIG. 4. The difference is that, due to the additional sixth shift element K5, even further variants of a third gear, which is active between the input shaft and the output shaft, can also be implemented in this case. In this way, a fifth variant 3.5 of the third gear results by actuating the third shift element K2 and the sixth shift element K5, a sixth variant 3.6 results by engaging the fifth shift element K4 and the sixth shift element K5, and a seventh variant 3.7 results by actuating the first shift element K1 and the sixth shift element K5. In addition, the fourth gear, which is active between the input shaft and the output shaft, can also be implemented in a fourth variant 4.4 by engaging the second shift element B1 and the sixth shift element K5.

The different operating modes described in FIG. 4 can also be implemented in the transmissions G from FIGS. 5 and 6. In addition, a second gear E2, which is active between the rotor R and the output shaft GW2, can also be implemented in this case. In this second gear E2, the rotor R is directly connected to the output shaft GW2 by actuating the sixth shift element K5, since the sixth shift element K5, in the actuated condition, rotationally fixes the first element E12 of the second planetary gear set P2 and, therefore, also the rotor R, directly to the output shaft GW2. In this case, a transmission ratio is implemented, which corresponds to a transmission ratio of the third gear which is active between the input shaft GW1 and the output shaft GW2. Originating from the second gear E2, the internal combustion engine VKM can be started into each of the gears 3.5, 3.6, 3.7 and 4.4, since the sixth shift element K5 also contributes to each of said gears.

In addition, in the transmissions G from FIGS. 5 and 6, a rotational-speed reduction of the electric machine EM can also be implemented by changing over from the first variant 4.1 into the fourth variant 4.4 of the fourth gear. For this purpose, originating from the first variant 4.1 and obtaining the tractive force via the internal combustion engine VKM, the load-free, fourth shift element K3 is initially disengaged and the load-free, sixth shift element K5 is engaged, wherein a rotational-speed adjustment for implementing the load-free conditions takes place by closed-loop control of the rotational speed of the electric machine EM. Apart from the fact that a rotational-speed reduction of the rotor R of the electric machine EM can be achieved by changing over into the fourth variant 4.4 of the fourth gear, it is also possible, as a result, to decouple the internal combustion engine VKM at any time by disengaging the second shift element B1 when the objective is to drive or brake (recuperation) with the aid of the electric machine EM.

Figure 8:
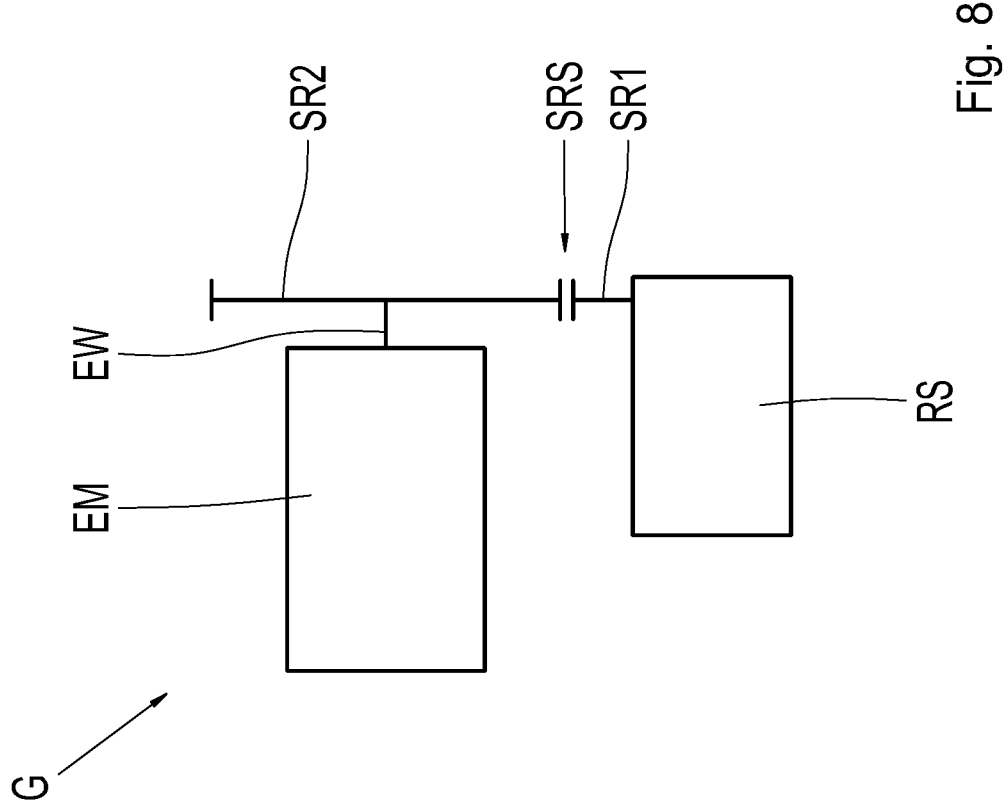
FIG. 8 shows a schematic of a modification of the transmissions from FIGS. 2, 3, 5 and 6.
Figure 9:
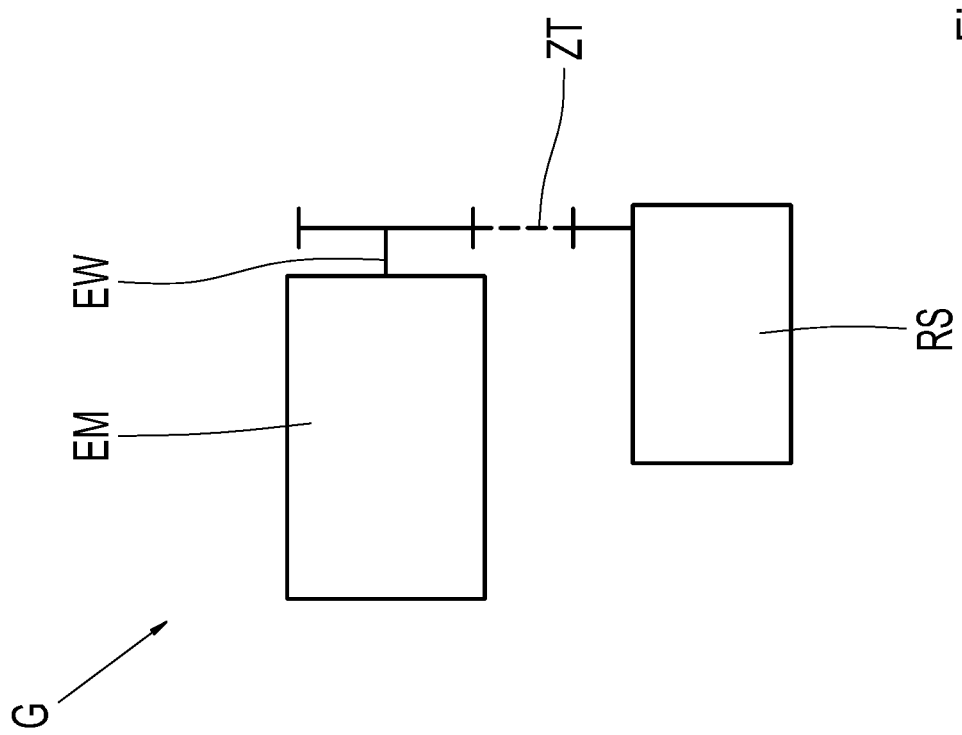
FIG. 9 shows a schematic view of yet another modification of the transmissions from FIGS. 2, 3, 5 and 6.

Finally, FIGS. 8 and 9 show design options of the transmissions G from FIGS. 2, 3, 5 and 6. These design options relate to alternative options for incorporating an electric machine EM. In FIG. 8, for example, the electric machine EM is not placed coaxially to the respective gear set RS of the transmission G (not represented in greater detail here), but rather is arranged so as to be axially offset. A connection takes place, in this case, via a spur gear stage SRS, which is composed of a first spur gear SR1 and a second spur gear SR2. The first spur gear SR1 is connected in a rotationally fixed manner in this case, on the part of the respective gear set RS of the transmissions G from FIGS. 2, 3, 5 and 6, at the point where the rotor R was connected in a rotationally fixed manner in the variants from FIGS. 2, 3, 5 and 6. The spur gear SR1 then meshes with the spur gear SR2 which is placed on an input shaft EW of the electric machine EM in a rotationally fixed manner, which establishes, within the electric machine EM, the connection to the rotor (not represented further in this case) of the electric machine EM.

In the case of the modification according to FIG. 9 as well, the electric machine EM is placed so as to be axially offset with respect to the respective gear set RS of the respective transmission G. In contrast to the preceding variant according to FIG. 8, a connection is not established in this case via a spur gear stage SRS, however, but rather via a flexible traction drive mechanism ZT. This flexible traction drive mechanism ZT can be configured as a belt drive or even a chain drive in this case. On the part of the gear set RS, the flexible traction drive mechanism ZT is then connected at the point at which a rotationally fixed connection of the rotor R was implemented in each of the transmissions G from the FIGS. 2, 3, 5 and 6. Via the flexible traction drive mechanism ZT, a coupling to the input shaft EW of the electric machine EM is then established, which, in turn, establishes a connection to the rotor of the electric machine, within the electric machine EM.

In the transmissions G from the FIGS. 2, 3, 5 and 6, provided this is permitted by the connection, an interlock of the first planetary gear set P1 can also be achieved, alternatively, in that the fifth shift element K4, in the actuated condition, rotationally fixes the second element E21 and the third element E31 of the first planetary gear set P1 or the first element E11 and the third element E31 of the first planetary gear set P1 to each other.

By the embodiments according to the invention, a transmission having a compact design and good efficiency can be implemented.

Modifications and variations can be made to the embodiments illustrated or described herein without departing from the scope and spirit of the invention as set forth in the appended claims.

REFERENCE CHARACTERS

G transmission
RS gear set
GG rotationally fixed component
P1 first planetary gear set
E11 first element of the first planetary gear set
E21 second element of the first planetary gear set
E31 third element of the first planetary gear set
P2 second planetary gear set E12 first element of the second planetary gear set
E22 second element of the second planetary gear set
E32 third element of the second planetary gear set
K1 first shift element
B1 second shift element
K2 third shift element
K3 fourth shift element
K4 fifth shift element
K5 sixth shift element
SP1 shift-element pair
SP2 shift-element pair
SP3 shift-element pair
first gear
second gear
3.1 third gear
3.2 third gear
3.3 third gear
3.4 third gear
3.5 third gear
3.6 third gear
3.7 third gear
4.1 fourth gear
4.2 fourth gear
4.3 fourth gear
4.4 fourth gear
E1 first gear
E2 second gear
EDA-V starting function for forward travel
GW1 input shaft
GW1-A mounting interface
GW2 output shaft
GW2-A mounting interface
AN connecting shaft
EM electric machine
S stator
R rotor
SRS spur gear stage
SR1 spur gear
SR2 spur gear
ZT flexible traction drive mechanism
VKM internal combustion engine
TS torsional vibration damper
AG differential gear
DW driving wheels

The invention claimed is:
1. A transmission (G) for a motor vehicle, comprising:
an electric motor (EM);
an input shaft (GW1);
an output shaft (GW2);
a pair of planetary gear sets with a first planetary gear set (P1) and a second planetary gear set (P2), each of the pair of planetary gear sets (P1, P2) including a plurality of elements (E11, E21, E31, E12, E22, E32); and
a plurality of shift elements with a first shift element (K1), a second shift element (B1), a third shift element (K2), a fourth shift element (K3), and a fifth shift element (K4),
wherein
a rotor (R) of the electric motor (EM) is connected to the input shaft (GW1), the output shaft (GW2), or at least one of the plurality of elements (E11, E21, E31, E12, E22, E32) of the pair of planetary gear sets (P1, P2),
the input shaft (GW1) is rotationally fixed to a second element (E21) of the first planetary gear set (P1) and is rotationally fixable to a first element (E12) of the second planetary gear set (P2) with the first shift element (K1),
a first element (E11) of the first planetary gear set (P1) is rotationally fixable to a rotationally fixed component with the second shift element (B1),
the first element (E11) of the first planetary gear set (P1) is rotationally fixable to the first element (E12) of the second planetary gear set (P2) with the third shift element (K2),
the output shaft (GW2) is rotationally fixed to a third element (E31) of the first planetary gear set (P1) and is rotationally fixable to a second element (E22) of the second planetary gear set (P2) by the fourth shift element (K3),
a third element (E32) of the second planetary gear set (P2) is rotationally fixed, and
two of the plurality of elements (E11, E21, E31) of the first planetary gear set (P1) are rotationally fixable to each other with the fifth shift element (K4).

2. The transmission (G) of claim 1, wherein selectively engaging the plurality of shift elements (K1, B1, K2, K3, K4) in pairs results in:
a first gear ratio (1) between the input shaft (GW1) and the output shaft (GW2) by actuating the first shift element (K1) and the fourth shift element (K3);
a second gear ratio (2) between the input shaft (GW1) and the output shaft (GW2) by actuating the third shift element (K2) and the fourth shift element (K3);
a third gear ratio between the input shaft (GW1) and the output shaft (GW2) by actuating
the fourth shift element (K3) and the fifth shift element (K4),
the first shift element (K1) and the fifth shift element (K4),
the third shift element (K2) and the fifth shift element (K4), or
the first shift element (K1) and the third shift element (K2), and
a fourth gear ratio between the input shaft (GW1) and the output shaft (GW2) by actuating
the second shift element (B1) and the fourth shift element (K3),
the first shift element (K1) and the second shift element (B1), or
the second shift element (B1) and the third shift element (K2).

3. The transmission (G) of claim 1, wherein the rotor (R) of the electric motor (EM) is continuously connected to the first element (E12) of the second planetary gear set (P2).

4. The transmission (G) of claim 3, wherein a first gear ratio (E1) between the first element (E12) of the second planetary gear set (P2) and the output shaft (GW2) is obtained by actuating the fourth shift element (K3).

5. A method for operating the transmission (G) of claim 3, wherein only the first shift element (K1) is engaged in order to implement a charging operation or a starting operation.

6. A method for operating the transmission (G) of claim 3, wherein the third shift element (K2) is engaged in order to implement a starting mode for forward travel during driving with the aid of the input shaft (GW1).

7. The transmission (G) of claim 1, wherein the electric motor (EM) is the only electric motor, and the electric motor (EM) is operable to drive the output shaft (GW2).

8. The transmission (G) of claim 1, further comprising an additional electric motor, a rotor of the additional electric motor is continuously connected to the input shaft (GW1).

9. The transmission (G) of claim 1, wherein the output shaft (GW2) is rotationally fixable to the first element (E12) of the second planetary gear set (P2) with a sixth shift element (K5).

10. The transmission (G) of claim 9, wherein a third gear ratio between the input shaft (GW1) and the output shaft (GW2) is obtained by actuating:
the third shift element (K2) and the sixth shift element (K5);
the fifth shift element (K4) and the sixth shift element (K5); or
the first shift element (K1) and the sixth shift element (K5).

11. The transmission (G) of claim 10, wherein a fourth gear ratio between the input shaft (GW1) and the output shaft (GW2) is obtained by actuating the second shift element (B1) and the sixth shift element (K5).

12. The transmission (G) of claim 9, wherein a second gear ratio (E2) between the first element (E12) of the second planetary gear set (P2) and the output shaft (GW2) is obtained by actuating the sixth shift element (K5).

13. The transmission (G) of claim 1, wherein:
at least one of the pair of planetary gear sets (P1, P2) is a negative planetary gear set;
a first element (E11, E12) of the at least one of the pair of planetary gear sets (P1, P2) is a sun gear;
a second element (E21, E22) of the at least one of the pair of planetary gear sets (P1, P2) is a planet carrier; and
a third element (E31, E32) of the at least one of the pair of planetary gear sets (P1, P2) is a ring gear.

14. The transmission (G) of claim 1, wherein:
at least one of the pair of planetary gear sets (P1, P2) is a positive planetary gear set;
a first element (E11, E12) of the at least one of the pair of planetary gear sets (P1, P2) is a sun gear;
a second element (E21, E22) of the at least one of the pair of planetary gear sets (P1, P2) is a ring gear; and
a third element (E31, E32) of the at least one of the pair of planetary gear sets (P1, P2) is a planet carrier.

15. The transmission (G) of claim 1, wherein:
two of the plurality of shift elements (K1, K4; B1, K2; K3, K5) are combined to form a shift-element pair (SP1; SP2; SP3) with an actuating element;
one of the shift-element pair (SP1; SP2; SP3) is actuatable with the actuating element in one direction originating from a neutral position; and
the other of the shift-element pair (SP1; SP2; SP3) is actuatable with the actuating element in the other direction originating from the neutral position.

16. A motor vehicle drive train for a hybrid vehicle, comprising the transmission (G) of claim 1.

* * * * *